United States Patent
Drujon et al.

(10) Patent No.: US 7,344,781 B2
(45) Date of Patent: Mar. 18, 2008

(54) POLYMERIC COMPOSITION COMPRISING A SEMI-CRYSTALLINE FLUORINATED POLYMER, AN ACRYLIC POLYMER AND A NUCLEATING AGENT, AND FORMULATIONS AND COATINGS OBTAINED FROM THESE COMPOSITIONS

(75) Inventors: Xavier Drujon, Bosdarros (FR); Scott Gaboury, Blue Bell, PA (US); Sophie Schneider, Strasbourg (FR); Jean-Claude Wittmann, Pfulgriesheim (FR)

(73) Assignee: Arkema France, Paris (FR)

( * ) Notice: Subject to any disclaimer, the term of this patent is extended or adjusted under 35 U.S.C. 154(b) by 148 days.

(21) Appl. No.: 10/928,126

(22) Filed: Aug. 30, 2004

(65) Prior Publication Data

US 2005/0032968 A1  Feb. 10, 2005

Related U.S. Application Data

(62) Division of application No. 09/744,937, filed as application No. PCT/FR00/01381 on May 19, 2000, now abandoned.

(30) Foreign Application Priority Data

May 31, 1999 (FR) .................................. 99 06842

(51) Int. Cl.
 *B32B 27/00* (2006.01)
(52) U.S. Cl. .................. 428/421; 428/422; 524/90; 524/91; 524/520; 524/522; 524/523
(58) Field of Classification Search ................. 428/421, 428/422; 524/90, 91, 520, 522, 523
See application file for complete search history.

(56) References Cited

U.S. PATENT DOCUMENTS

| 3,579,370 | A |   | 5/1971 | Punderson et al. |
| 3,701,749 | A | * | 10/1972 | Segawa et al. ............... 524/90 |
| 3,719,644 | A | * | 3/1973 | Segawa et al. ............. 525/367 |
| 5,344,904 | A | * | 9/1994 | Wakamori et al. .......... 526/254 |
| 6,313,222 | B1 | * | 11/2001 | Lin et al. .................... 525/180 |

OTHER PUBLICATIONS

Chem abstracts 127:222032 CA & JP 09 221621(Aug. 26, 1997).
Chem Abstracts JP 10 017815 (Jan. 20, 1998).
Chem Abstracts JP 48 034956 (Kureha Chem Ind. Co. Ltd) (May 23, 1973).

* cited by examiner

*Primary Examiner*—Peter D. Mulcahy
(74) *Attorney, Agent, or Firm*—Millen, White, Zelano & Branigan, P.C.

(57) ABSTRACT

This polymeric composition comprises a blend of polymers comprising:

(a) a semi-crystalline fluorinated polymer, (b) an acrylic polymer, and is characterized in that it additionally comprises:

(c) from 0.01 to 20% by weight, with respect to the total weight of the semi-crystalline fluorinated polymer and of the acrylic polymer, of a nucleating agent in the form of particles having a melting point greater than that of the semi-crystalline fluorinated polymer.

These compositions result in formulations in the form of dry powders or of powders in suspension in water or in a latent solvent for the semi-crystalline fluorinated polymer.

Applied to a substrate, these formulations give, by baking, glossy and stable coatings comprising spherulites with a size of less than 5 μm.

26 Claims, 1 Drawing Sheet

Figure 1

POLYMERIC COMPOSITION COMPRISING A SEMI-CRYSTALLINE FLUORINATED POLYMER, AN ACRYLIC POLYMER AND A NUCLEATING AGENT, AND FORMULATIONS AND COATINGS OBTAINED FROM THESE COMPOSITIONS

This application is a divisional of application Ser. No. 09/744,937, filed Apr. 24, 2001 now abandoned which is a 371 of French application no. PCT/FR/00/01381 filed May 19, 2000.

The present invention relates to compositions based on a semi-crystalline fluorinated polymer and on an acrylic polymer, to the corresponding formulations and to the coatings obtained from these formulations.

Among fluorinated polymers, vinylidene difluoride (VF2) homopolymers and copolymers of VF2 with other unsaturated fluorinated monomers are valued for their convertibility, their mechanical properties and their exceptional resistance to attacks by chemicals and the weather.

These VF2 polymers or copolymers can be processed by conventional conversion techniques, such as extrusion or injection blow moulding. The stability of the items thus obtained with regard to high temperatures, corrosive liquids, oxidizing agents or UV radiation is often comparable with that of completely fluorinated materials. Consequently, VF2 (co)polymers have found numerous applications in fields such as mechanical engineering, electrical and electronic engineering, and chemical engineering.

Furthermore, it is known that poly(vinylidene difluoride) (PVDF), which is a semi-crystalline polymer, has the distinguishing feature of being compatible with other polymers, in particular acrylic polymers.

Furthermore, it is known that, in blends with an amorphous polymer, PVDF can only crystallize if its concentration is greater than 40% by weight. If the concentration of PVDF remains below 40%, the blend is amorphous. The compatibility is therefore limited by the crystallization of the PVDF, which results in a partial phase separation.

The compatibility of a blend of PVDF and a polymer X is demonstrated by the existence of a single glass transition temperature (Tg) of the blend and by a dip in the melting point measured by Differential Thermal Analysis (DTA). Other techniques, such as the NMR of the solid or Dynamic Mechanical Analysis (DMA), have confirmed these results. This compatibility is rationalized by the presence of specific interactions between the hydrogen atoms of the PVDF and the carbonyl groups of the poly(methyl methacrylate) (PMMA). A nonexhaustive list of polymers which are compatible with PVDF is given in Table I hereinbelow.

TABLE I

| Polymer | Differential thermal analysis | Compatibility with PVDF |
| --- | --- | --- |
| Poly(methyl methacrylate) | 1 Tg | yes |
| Poly(ethyl methacrylate) | 1 Tg | yes |
| Poly(methyl acrylate) | 1 Tg | yes |
| Poly(ethyl acrylate) | 1 Tg | yes |
| Poly(vinyl acetate) | 1 Tg | yes |
| Poly(vinyl methyl ketone) | 1 Tg | yes |

The above remains qualitatively applicable to $VF_2$ copolymers comprising up to approximately 30% by weight of other fluorinated ethylenic compounds, such as vinyl fluoride (VF), hexafluoropropylene (HFP), tetrafluoroethylene (TFE) and trifluoroethylene (TrFE), as well as to acrylic copolymers predominantly composed of monomer units such as those reported in Table I.

The composition of the blend and its thermal history have a dominating influence on the degree of compatibility and the morphology of the material. When cooling such a blend from the molten state, three regions can be distinguished:

For high levels of PMMA (greater than 60% by weight with respect to the total weight of the composition), the PVDF does not crystallize and a single glass transition temperature is observed.

For low levels of PMMA (less than 25% by weight), the degree of crystallinity is constant and close to the degree of crystallinity of PVDF alone, i.e. approximately 45%, the remainder being amorphous.

In an intermediate zone, between 25 and 60% by weight of PMMA, the degree of crystallinity is low. However, the PVDF in the amorphous phase has a tendency to gradually crystallize, at a speed which increases with the temperature.

In point of fact, it is this intermediate composition region, between 25 and 60% of PMMA, which is the most advantageous from an applicational viewpoint: the presence of a crystalline phase (PMMA of less than 60%) is necessary in order to obtain good mechanical properties and good behaviour towards heat. On the other hand, a level of PMMA of less than 25% results in poor initial optical properties and embrittles the material.

Thus, items (for example: pipes, films, fibres) having excellent initial optical and mechanical properties can be manufactured by the extrusion or injection blow moulding of PVDF/PMMA blends. However, the gradual crystallization of the PVDF results in a more or less rapid deterioration in the transparency and mechanical properties.

Moreover, blends of PVDF and acrylic polymers are used to obtain architectural coatings for protecting substrates, such as steel, aluminium or plastics, from the weather. These coatings, based on PVDF and an acrylic polymer, are known from the work: Modern Fluoropolymers, edited by John Scheirs, 1997, John Wiley & Sons Ltd., Chapter 14, pp. 271-299, Fluoropolymer Coatings for Architectural Applications. These blends can be formulated before application in solution or in dispersion in a solvent or alternatively in water and, finally, in the form of a powder. These blends can also be directly extruded over the substrates to be protected. The main components of a formulation such as above are as follows:
PVDF
acrylic resin
pigments
optionally water and/or organic solvents
other additives.

After application of this formulation to the substrate, the unit is brought to high temperature, until the PVDF has melted and/or dissolved, and then cooled. These coatings are shown to be superior to those obtained by using resins, such as siloxanes, acrylates, polyurethanes or polyesters, in terms of protection against attacks by chemicals or the weather. However, they exhibit a number of disadvantages:
in terms of optical properties, an excessively low gloss,
a gradual increase in the degree of crystallinity over time.
As a result of the contraction in volume which results therefrom, the coating is subjected to significant internal stresses and its flexibility decreases. This can result in the formation of cracks during the shaping of the substrate.

It is therefore desirable to find a means which makes it possible to stabilize the degree of crystallinity of blends of PVDF and PMMA while retaining the best compromise in terms of optical and mechanical properties.

In the review Kunststoffberater 11/95, pp. 34-38, Modification de la structure et des propriétés de plastiques semi-cristallins [Modification of the structure and properties of semi-crystalline plastics], by J. Bongardt and T. Sanders, the authors tackle the problem of the crystallization of PVDF as spherulites under the effect of nucleating agents, in particular of poly(tetrafluoroethylene) (PTFE) powder at concentrations of 0.05 to 1% by weight. It turns out that the spherulite diameter decreases asymptotically when the amount of nucleating agents increases. In the case of a fine PTFE powder (3 μm) instead of a PTFE powder (40 μm), a more pronounced effect is observed due to the larger number of seeds. The technological result of the nucleation is a decrease in the duration of the crystallization and therefore in the duration of solidification in the mould. The crystallization conditions, modified by the nucleation with PTFE powder, lead to the increase in the crystallinity and that of the modulus of elasticity. The use of different fine-grained nucleating agents, made of PTFE or poly(tetrafluoroethylene-co-perfluorovinyl ethers) (PFA, sold by the company Dupont) or poly(ethylene-co-tetrafluoroethylene) (ETFE) or alternatively irradiated PVDF, did not introduce significant differences; in all cases, the diameter of the spherulites obtained was reduced by a factor of 3 to 4 and is approximately 40 μm for 1% of PTFE.

Japanese Patent Application JP-48-34956 teaches the process for the preparation of a PVDF-based compound which consists in blending the PVDF particles or latex with from 0.05% to 30% of fluorinated resin latex, the melting temperature of which resin is greater than that of the PVDF. Such a fluorinated resin can be poly(vinyl fluoride), polytetrafluoroethylene (PTFE), polychlorotrifluoroethylene or alternatively resins chosen from homopolymers and copolymers of vinyl fluoride (VF), chlorotrifluoroethylene (CTFE), vinylidene difluoride ($VF_2$) and dichlorodifluoro-ethylene ($VF_2Cl_2$), the melting points of which resins are higher than that of the PVDF. Normally, from 0.05 to 3% by weight with respect to the PVDF of latex of these fluorinated resins is added, the particles of which have a diameter of 0.05 to 1 μm. In Example 8, PVDF, blended with 0.05 μm PTFE particles, gives, after melting the PVDF at 250° C., a plate with a thickness of 1 mm comprising spherulites with a size of less than 1 μm.

There are numerous publications and patents which disclose the use of PVDF and its copolymers in the formation of coatings. By way of example, mention may be made of U.S. Pat. Nos. 3,324,069, 4,128,519 or 5,177,150, International Patent WO 93/13178 and European Patent EP 0,670,353 A2.

The acrylic modifier is selected according to the properties required for the coating. Use may be made of blends of several modifiers. An acrylic thermoplastic based on methyl methacrylate is generally used but acrylic thermosetting plastics can also be used.

The main aim of this acrylic compound is
a) to improve the dispersion of the pigment
b) to increase the adhesion to the substrate covered by the coating.

Acrylic modifiers are copolymers of one or more alkyl esters of acrylic acid or of methacrylic acid, optionally with other polymerizable unsaturated monomers. To obtain a coating having good initial properties and good behaviour with regard to ageing, it is preferable for the acrylic modifier to be at least partially compatible with PVDF. For this reason, in the context of the invention, preference is particularly given to copolymers of one or more methyl or ethyl esters of acrylic acid or of methacrylic acid, optionally with other polymerizable unsaturated monomers. Preference is very particularly given to a copolymer of methyl methacrylate and of ethyl acrylate with a molecular mass of between 50,000 and 150,000. The other polymerizable unsaturated monomers are chosen from:

other alkyl esters of acrylic acid or of methacrylic acid, such as butyl acrylate, 2-ethylhexyl acrylate or ethyl methacrylate styrenes, such as styrene or α-methylstyrene nitrites, such as acrylonitrile and methacrylonitrile vinyls, such as vinyl acetate or vinyl chloride.

Functional monomers, such as acrylic or methacrylic acid, hydroxyethyl acrylate or methacrylate, or hydroxypropyl acrylate or methacrylate, can also be incorporated in the acrylic modifier. In this case, it is possible to use a crosslinking agent, such as isocyanates or blocked isocyanates. It is also possible to use, as comonomers, monomers carrying self-crosslinking functional groups, for example N-(alkoxymethyl)acrylamide and N-(alkoxymethyl)methacrylamide.

The pigments are added for three main reasons:
(1) for aesthetic reasons
(2) for the stability of the colours
(3) to obtain opacity with regard to ultraviolet radiation.

The pigments are generally chosen from:
calcined metal oxides and mixed metal oxides
rutile titanium dioxide
mica.

It is, of course, specified that the respective amounts of each of the ingredients entering into the composition of the coating, as well as the choice of the precise nature of each type of these ingredients, will depend on the properties required for the coating, according to the targeted application. Furthermore, additives commonly used in the formulation of film-forming polymers can also be present. These additives can be plasticizers, surfactants, antioxidants, stabilizers, including UV stabilizers, agents for controlling the rheology, coalescence agents, crosslinking agents, catalysts, and the like. It is generally preferred that:
1. At least 70% by weight of the total resin should be PVDF, and
2. At least 40% by weight of all the solids should be PVDF.

Several processes can be used to apply the compositions:
either using organic solvents (there are many publications which disclose the use of PVDF and its copolymers in the formation of coatings). Mention may be made, by way of example, of U.S. Pat. Nos. 3,324,069, 4,128,519 and 5,177,150, WO 93/13178 and EP 0,670,353 A2.
or using an aqueous dispersion (disclosed, for example, in U.S. Pat. No. 4,309,328)
or in the form of a powder (disclosed, for example, in U.S. Pat. No. 5,030,394), which method consists in extruding, in the molten state, the PVDF, the acrylic modifier and the additives (pigments, and the like) which are mentioned above, in then granulating the lace obtained after cooling, and in cryogenically milling the granules obtained. The powder which is obtained is subsequently applied to a substrate and subjected to a heat treatment.

The most widely used process for applying PVDF compositions in the form of a formulation consists in dispersing and/or dissolving the various constituents of the composition in an organic solvent and in depositing them (by spool coating or by atomization via a nozzle) on a substrate generally covered beforehand with a primer. The process allows for baking the substrate at high temperature, generally ranging from 150 to 260° C., in order to remove the solvent and to convert the PVDF into a film.

(Modern Fluoropolymers, edited by John Scheirs, 1997, John Wiley & Sons Ltd., Chapter 14, pp. 271-299, Fluoropolymer Coatings for Architectural Application)

The main functions of the organic solvents used with PVDF-based formulations are therefore:

1. To provide the medium for dispersing the solid components (PVDF resin, pigments and other solid additives).
2. To modify the viscosity of the formulation in order to render it suitable for the method of application of the latter.
3. To dissolve the PVDF resin and to promote blending with the acrylic modifier during the baking cycle (helps in the coalescence).

There exist three main classes of solvents associated with PVDF resins.

1. So-called active solvents, which dissolve the PVDF resin at room temperature:
    a) polar solvents
    b) amides, phosphates or ketones of low molar mass.
2. So-called latent solvents, which do not dissolve the PVDF resin at room temperature but only at high temperature:
    a) ketones of high molar mass
    b) esters
    c) glycol ethers
    d) glycol ether esters.
3. Non-solvents, which do not dissolve the PVDF resin whatever the temperature: hydrocarbons, alcohols or chlorinated solvents.

Latent solvents are the most widely used for the PVDF resin. They make it possible to obtain formulations with a dispersion of the solids of 40 to 60% by weight. By raising the temperature during the baking cycle, the PVDF resin, in the form of a fine suspension, dissolves in the solvent and coalesces to produce a uniform film by evaporation of the solvent.

The latent solvent is generally chosen from butyrolactam, isophorone, methyl isoamyl ketone, cyclohexanone, dimethyl phthalate, propylene glycol methyl ether, propylene carbonate, diacetone alcohol or glycerol triacetate.

Active solvents can be used to produce a solution but then the content of so-called dry matter is generally limited to approximately 20 to 25% by weight as the viscosity is too high at higher contents.

Non-solvents are used as diluents in PVDF-based formulations.

A typical PVDF-based formulation has the following composition (as percentage by weight):
    PVDF resin (20-25%) a minimum of 70% of the resinous part a minimum of 40% of all the solids
    acrylic resin (8-11%)
    pigments (12-16%)
    solvents (50-60%).

The process allows for baking the substrate at high temperature, generally ranging from 150 to 260° C. During cooling, PVDF crystallizes in the form of spherulites having an apparent size of approximately 30 µm. The liquid state, starting from which this recrystallization is carried out, can be, in the context of the invention, according to the evaporation and recrystallization kinetics, either a pure molten polymeric phase or a phase comprising at least one of the abovementioned organic solvents.

Starting from a dispersion of the prior art comprising PVDF, at least one modifier of the acrylic type, optionally pigments, at least one organic solvent and optionally other additives, it is found that the mechanical properties and the appearance of the final coating depend on the composition of the blend, on the nature of the PVDF used (composition, molecular mass), on the nature of the modifier of the acrylic type (degree of miscibility with the PVDF, Tg) and also on the thermomechanical history.

The aim of the present invention is to obtain a composition based on a semi-crystalline fluorinated polymer and on an acrylic modifier capable of being put into the form of a formulation, the latter resulting, by covering of a substrate, then by baking, followed by cooling, in a substrate covered with a uniform and adherent coating, this coating having to have a structure which is stable over time and an improved gloss.

This aim is achieved by a polymeric composition comprising a blend of polymers comprising:
    (a) a semi-crystalline fluorinated polymer,
    (b) an acrylic polymer, characterized in that it additionally comprises:
    (c) from 0.01 to 20% by weight, with respect to the total weight of the semi-crystalline fluorinated polymer and of the acrylic polymer, of a nucleating agent in the form of particles having a melting point greater than that of the semi-crystalline fluorinated polymer.

The particles advantageously have a size of 0.05 µm to 5 µm.

The particles preferably have a size of 0.05 µm to 0.5 µm.

This is because a very fine particle size of the nucleating agent promotes the rate of crystallization during the cooling of the semi-crystalline fluorinated polymer.

The nucleating agent may be added either to the semi-crystalline fluorinated resin (polymer) or to the acrylic polymer modifier or else to the blend of these two polymers. The semi-crystalline fluorinated polymer and the acrylic modifier, during this addition, can be in the form of a powder or of an aqueous dispersion or alternatively of a dispersion in a latent solvent for the semi-crystalline fluorinated polymer.

The nucleating agent can be flavanthrone but the latter has the disadvantage of giving a slight yellow colour to the final coating. In fact, we have found that flavanthrone, disclosed in U.S. Pat. No. 3,701,749, remains active as nucleating agent in the compositions and formulations according to the present invention.

The nucleating agent, preferably in the form of a latex, is advantageously a tetrafluoroethylene homopolymer or a copolymer of tetrafluoroethylene with a fluorinated ethylenic compound.

The nucleating agent, preferably in the form of a latex, is advantageously chosen from:
crystalline fluorinated polymers with a melting point greater than that of the semi-crystalline fluorinated polymer of the formulation. They are generally chosen from tetrafluoroethylene homopolymers or copolymers of tetrafluoroethylene with a compound comprising fluorinated ethylenic unsaturation. It is preferably chosen from a tetrafluoroethylene homopolymer or a copolymer of tetrafluoroethylene comprising from 0.1 to 20 mol % of vinylidene fluoride, vinyl fluoride, hexafluoropropylene, trifluoroethylene, chlorotrifluoro-ethylene or hexafluoroisobutylene or alternatively from poly(ethylene-co-tetrafluoroethylene) (ETFE), poly-(tetrafluoroethylene-co-perfluorovinyl ethers) (PFA) and irradiated PVDF.

These last three nucleating agents are already known as forming crystallization seeds in PVDF alone (see Patent Application JP-46 701 45 and the article Kunststoffberater 11/95 hereinabove.

The semi-crystalline fluorinated polymer is advantageously a vinylidene difluoride homopolymer or a copolymer of vinylidene difluoride with a fluorinated ethylenic monomer or a non-fluorinated ethylenic compound or a non-fluorinated diene, monomers which are copolymerizable with vinylidene difluoride.

The fluorinated ethylenic monomer is advantageously chosen from vinyl fluoride, hexafluoropropylene, trifluoroethylene, chlorotrifluoroethylene, tetrafluoroethylene or hexafluoroisobutylene, the non-fluorinated ethylenic monomer is advantageously chosen from the group consisting of cyclohexyl vinyl ether and hydroxyethyl vinyl ether, and the non-fluorinated diene is advantageously chosen from the group consisting of butadiene, isoprene and chloroprene.

The semi-crystalline fluorinated polymer is advantageously a copolymer of vinylidene difluoride with from 0.1 to 20 mol % of vinyl fluoride or hexafluoropropylene or trifluoroethylene or chlorotrifluoroethylene or tetrafluoroethylene.

The semi-crystalline fluorinated polymer is preferably a vinylidene difluoride homopolymer.

The acrylic polymer (acrylic modifier) is advantageously chosen from copolymers of one or more methyl or ethyl esters of acrylic acid or of methacrylic acid, optionally with other polymerizable unsaturated monomers chosen from:
other alkyl esters of acrylic acid or of methacrylic acid, such as butyl acrylate or 2-ethylhexyl acrylate,
styrenes, such as styrene or α-methylstyrene,
nitrites, such as acrylonitrile and methacrylonitrile,
vinyls, such as vinyl acetate or vinyl chloride, with the additional condition that the methyl and/or ethyl acrylate and/or the methyl and/or ethyl. methacrylate represent, by weight, at least 70% of the total weight of the said acrylic polymer.

The acrylic polymer is preferably obtained from one or more monomers chosen from methyl acrylate, methyl methacrylate, ethyl acrylate or ethyl methacrylate.

In general, in the composition, the semi-crystalline fluorinated polymer is PVDF, the acrylic (co)polymer is PMMA and the PVDF/PMMA ratio by weight is from 30/70 to 95/5.

Advantageously, in the latter composition, the PVDF/PMMA ratio by weight is from 70/30 to 35/65.

Preferably, in the latter composition, the PVDF/PMMA ratio by weight is from 60/40 to 40/60.

The Applicant Company has found that the addition of a nucleating agent for PVDF to blends of PVDF and PMMA with a composition of between PVDF/PMMA=95/5 and 30/70 makes it possible to decrease the size of the spherulites obtained, with respect to the same PVDF/PMMA blend without nucleating agent, under the same conditions of cooling from the molten state.

The Applicant Company has also found, unexpectedly, that the addition of nucleating agents for PVDF to blends of PVDF and PMMA with a composition of between PVDF/PMMA=60/40 and 40/60 makes it possible to obtain a large increase in the degree of crystallization during cooling of these blends from the molten state.

It is surprising, according to the publication Wittmann J. C. and Lotz B., *J. Polym. Sci., Polym. Phys.,* 19, 1837, 1981, that crystallographic interactions between PTFE and PVDF can take place, as these crystallographic interactions are in competition with interactions of hydrogen bond types well known for PVDF/PMMA systems from the publication Bernstein R. E., Warhmund D. C. et al., *Polym. Eng. Sci.,* 18, 1220, 1979. In other words, PVDF/PMMA interactions do not prevent interactions of crystallographic type which are the cause of the effectiveness of PTFE.

The suppression of the nucleating effect by the amorphous polymer is in fact a major problem in compatible systems combining crystalline and amorphous polymer and has a considerable impact on the nucleation. This effect can be illustrated by two examples demonstrating the neutralization of "natural" seeds and "added" seeds, that is to say nucleating agents:

(1) The addition of very small amounts (0.5 to 5%) of poly(vinyl butyral) (PVB) to linear polyesters (for example poly(ε-caprolactone) (PCL)) greatly slows down the rates of growth and dramatically reduces the density of active seeds: in the blends, the spherulites exhibit diameters from 20 to 50 times greater (indeed even more) and the density is reduced by at least two, indeed even three, orders of magnitude (Keith H. D., Padden F. J. and Russel T. P., *Macromolecules,* 22, 666, 1989).

(2) PVDF can be nucleated with sepiolite (a hydrated magnesium silicate). On the other hand, this nucleating effect is completely inhibited in PVDF/PMMA blends. This effect is interpreted as being due to "a loss or a suppression of the surface activity of sepiolite due to specific interactions between sepiolite and the polymeric medium" (Herrero C. R., Morales B. and Acosta J. L., *J. Appl. Polym. Sci.,* 51, 1189, 1994).

Unexpectedly, in relation to the two preceding publications, PTFE is unaffected by the presence of PMMA and retains all its nucleating activity.

An outstanding advantage obtained by virtue of the compositions of the present invention results from the high degrees of crystallinity achieved by PVDF in the blend which has been subjected to the intermediacy of a liquid phase and then to solidification, either by evaporation of a solvent or by cooling.

The improvement in the overall kinetics of crystallization, in spite of the considerable slowing down in the linear rates of growth in the mixture (see Wang T. T. and Nishi T., *Macromolecules,* 10, 421, 1977) related to PVDF/PMMA interactions, makes it possible to achieve degrees of crystallinity which were hitherto only observed in pure PVDFs alone. This is because the increase in the crystallization temperatures obtained by the addition of PTFE germinating agent makes it possible to crystallize the PVDF in a temperature region (and region of rate of growth of the blend) which could not normally be achieved under industrial operating conditions.

The application is particularly useful in improving the properties of PVDF-comprising coatings.

The present invention also comprises a process for the preparation of a dry formulation, starting from the compositions of the invention, which is characterized in that a latex of the semi-crystalline fluorinated polymer is blended with the nucleating agent, in that the blend obtained is then coagulated and dried in order to recover a powder, in that this powder is then blended with the acrylic polymer and optionally other additives, such as fillers, colorants or processing aids, by extrusion at a temperature of 150° C. to 280° C., and in that the extrudate is cooled before being milled to give a fine powder.

An alternative form of the above process, which avoids the involvement of an isolated intermediate formulation, comprises a process for obtaining the coating which is characterized in that a latex of the semi-crystalline fluorinated polymer is blended with the nucleating agent, in that the blend obtained is then coagulated and dried in order to recover a powder, and in that this powder is then blended with the acrylic polymer and optionally other additives, such as fillers, colorants or processing aids, by extrusion at a temperature of 150° C. to 280° C. while directly covering the substrate to be protected.

The present invention also comprises the formulations obtained from the above compositions.

Thus, by blending a semi-crystalline fluorinated polymer latex with the nucleating agent, by then coagulating and drying the blend obtained in order to recover a powder, and by then blending this powder with the acrylic (co)polymer and optionally other additives, such as fillers, colorants or processing aids, by dispersing in the latent solvent, a formulation is obtained which is characterized in that it comprises a latent solvent for the semi-crystalline fluorinated polymer of the said composition.

Analogously, a formulation is obtained which is characterized in that it comprises water as agent for dispersing the said composition. The process for obtaining this formulation is characterized in that a semi-crystalline fluorinated polymer latex is blended with a latex of the nucleating agent, in that the blend obtained is then coagulated and dried in order to recover a powder, in that this powder is then blended with the acrylic (co)polymer and optionally other additives, such as fillers, colorants or processing aids, and in that the combined mixture is dispersed in water.

The formulation can also be provided in the form of a fine powder having particles with a highest size of the order of several hundred µm. In such a powder, the nucleating agent can be, for example, PTFE in the form of particles with a size ranging from 0.05 to 5 µm or better still from 0.05 to 0.5 µm. The process for obtaining this fine powder is characterized in that, the composition being provided in the form of a coarse powder optionally comprising additives, such as fillers, colorants or processing aids, this powder is milled.

The present invention also relates to the coatings obtained from the above formulations. Such coatings have an overall semi-crystalline fluorinated polymer/acrylic modifier composition identical to that of the starting composition which was employed.

Each of these coatings is first of all characterized in that it is in the form of a continuous film covering the substrate with strong adhesion, this film comprising spherulites with a size of less than 5 µm.

The present invention also comprises the process for obtaining the coating from one of the above formulations, characterized in that it comprises a stage of baking the substrate covered with the formulation at a temperature T which is high enough to produce a liquid phase comprising the semi-crystalline fluorinated polymer and in which the nucleating agent remains at least partially in the form of solid crystalline seeds, this temperature T being below the melting temperature of the nucleating agent, and a cooling stage in which the semi-crystalline fluorinated polymer at least partially crystallizes with the formation of spherulites with a size of less than 5 µm.

The baking temperature preferably ranges from 150° to 275° C.

A coating capable of being obtained by the baking and cooling of a substrate covered with the formulation is thus obtained, characterized in that it is in the form of a continuous film which adheres to the substrate while covering it, this film comprising fluorinated polymer spherulites with a size of less than 5 µm, and in that the composition of this film is overall the same as the composition used in the preparation of the formulation.

This coating has the advantage of being stable over time and of being glossier than the coatings of similar compositions but without a nucleating agent.

The present invention will be better understood with the help of the following examples, given by way of illustration.

EXPERIMENTAL PART

Example 1

Increase in the Degree of Crystallinity by Addition of PTFE to PVDF/PMMA Blends

Preparation of the Formulations:

A first series of formulations was prepared by blending PVDF and PMMA latices in proportions ranging from 80/20 to 40/60 (see Table II). A second series of formulations was prepared by using the blends described above to which have been added 0.5% of PTFE in the form of a latex (see Table III).

The PVDF latex is a Kynar® 740 latex prepared according to Patent EP 169,328.

Kynar® 740 is sold by the Company Elf Atochem. The PTFE is a latex sold by Dupont under the reference Zonyl 30N.

The PMMA latex was obtained by polymerization of methyl methacrylate according to the following directions:

The following are introduced into a stainless steel reactor equipped with a stirrer:

| | |
|---|---|
| Distilled water | 601 g |
| Sodium hydrogenphosphate | 1.76 g |
| Sodium dodecyl sulphate | 14.7 g dissolved in 53.3 g of water |
| Methyl methacrylate | 504.1 g |
| Sodium metabisulphite | 0.42 g dissolved in 9 g of water |
| tert-Dodecyl mercaptan | 1.77 g |

The reactor is heated to 63° C. before adding:

| | |
|---|---|
| Potassium persulphate | 0.67 g dissolved in 15 g of water |

After 5 minutes of inhibition, an exotherm is observed which brings the temperature of the reactor to 110° C. The reactor is cooled to 80° C. and the following are added:

| | |
|---|---|
| Sodium metabisulphite | 0.068 g dissolved in 2 g of water |
| tert-Butyl hydroperoxide | 0.252 g dissolved in 2 g of water |

After stirring for one hour, the final product is recovered.
The following characteristics are measured:
Conversion of the monomer to polymer (gravimetry) 99.5%
Size of the latex particles: 80 nm Molecular mass (steric exclusion chromatography): Mn=58, 500 g/mol, Mw=461,000 g/mol Coagulation:

The various formulations are frozen in order to destabilize the latices, then defrosted at room temperature and centrifuged at 20,000 rev/min for 30 minutes. The supernatant phase is discarded. The samples are subsequently washed by redispersing in distilled water and centrifuging, which operation is repeated three times. Finally, the sample is dried under vacuum at 50° C. for 24 hours. It is confirmed that the compositions of the formulations have not been modified by the coagulation operation by determining the PVDF/PMMA ratio by thermogravimetric analysis.

Differential Thermal Analysis:

The crystallization temperature and the degree of crystallinity (α) of the samples thus obtained are measured by differential thermal analysis. The measuring conditions are as follows:

constant heating rate and constant cooling rate, both equal to 10° C./min, the sample is brought to 200° C., which temperature is maintained for 10 minutes (heating 1), the sample is recrystallized by cooling to 20° C. (cooling 1), the sample is brought to 200° C. (heating 2).

The crystallization temperatures and the degrees of crystallinity (α) measured for the various samples are reported in Tables II and III below.

It should be noted that the degree of crystallinity is determined via the measurement of the enthalpy of crystallization (in relation to the content of PVDF in the blend).

Discussion:

The increase in the content of PMMA for the formulations not comprising PTFE results in a decrease in the crystallization temperature and in the degree of crystallinity. Furthermore, beyond 40% of PMMA, the crystallization during the first cooling is no longer complete and can continue during the second rise in temperature.

Figure 1:
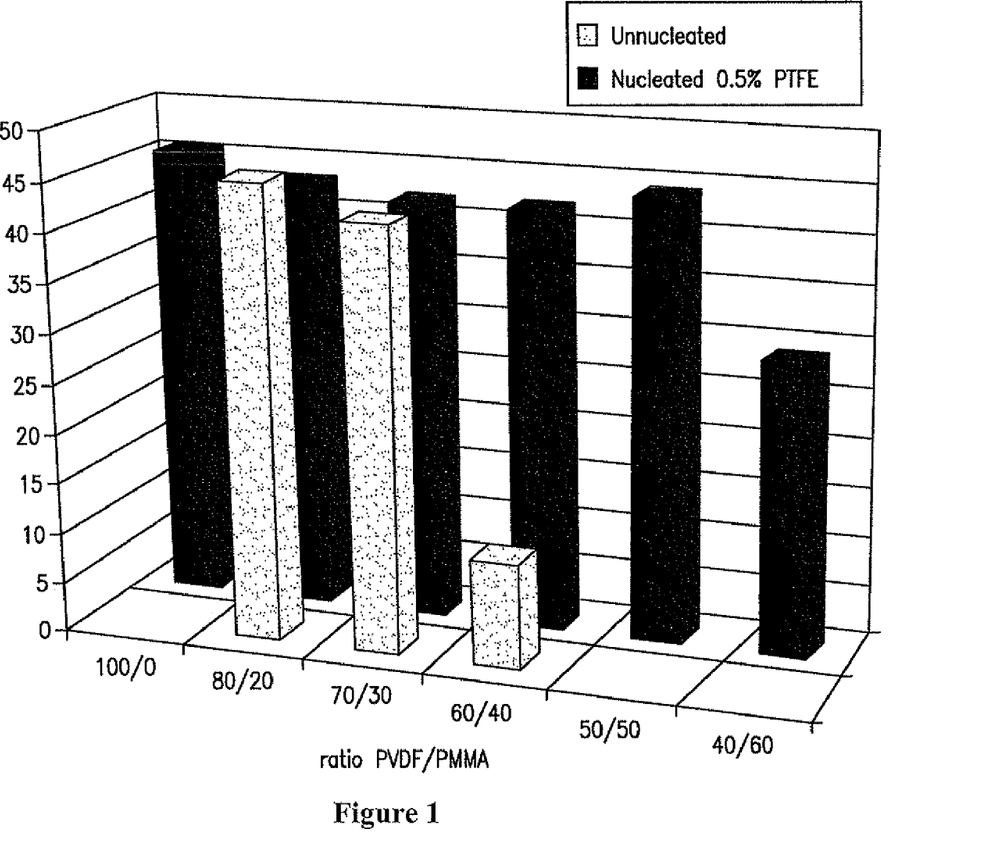
FIG. 1 represents the increase in the degree of crystallinity measured during the cooling of PVDF/PMMA blends comprising 0.5 of PTFE Example 2

The addition of PTFE to these blends is reflected in all cases by an increase in the crystallization temperature and complete crystallization during the first cooling. Furthermore, as is shown in Graph 1 hereinbelow, the degree of crystallinity, if it is not already at its maximum value (namely, in the region of 45%), is significantly increased. In fact, the blends comprising up to 50% of PMMA reach the maximum degree of crystallinity, whereas, without the addition of PTFE, only blends comprising a minimum of 70% of PVDF could reach such degrees. For the nucleated blend comprising 60% of PMMA, the maximum degree of crystallinity is not reached but the increase with respect to the same unnucleated blend is not insignificant.

TABLE II

Crystallization temperature and degree of crystallinity of the PVDF/PMMA blends not comprising PTFE

| | PVDF/PMMA formulations | Measured during the first cooling | | Measured during the second heating | | TOTAL |
|---|---|---|---|---|---|---|
| | | Tc(° C.) | α (as % of PVDF) | Tc(° C.) | α (as % of PVDF) | α (as % of PVDF) |
| Without PTFE | 100/0 | 132.0 | 46.0 | — | — | 46.0 |
| | 80/20 | 118.7 | 45.6 | — | — | 45.6 |
| | 70/30 | 116.1 | 42.3 | — | — | 42.3 |
| | 60/40 | 112.1 | 10.8 | 96.4 | 15.2 | 26.0 |
| | 50/50 | — | 0 | 93.0 | 13.5 | 20.0 |
| | 40/60 | — | 0 | 90.6 | 12.0 | 12.0 |

TABLE III

Crystallization temperature and degree of crystallinity of the PVDF/PMMA blends comprising 0.5% of PTFE

| | PVDF/PMMA formulations | Measured during the first cooling | |
|---|---|---|---|
| | | Tc (° C.) | α (as % of PVDF) |
| With PTFE | 100/0 | 143.4 | 45.6 |
| | 80/20 | 138.5 | 43.0 |
| | 70/30 | 132.3 | 41.7 |
| | 60/40 | 131.1 | 42.0 |
| | 50/50 | 126.6 | 44.0 |
| | 40/60 | 127.6 | 29.0 |

Compositions, Formulations and Coatings Obtained with the Methyl Methacrylate/Ethyl Acrylate Copolymer as Acrylic Polymer The starting materials used are as follows:

the PVDF is sold by Elf Atochem under the trade name Kynar® 500. The melting temperature is 160° C. and the viscosity, measured on a capillary rheometer at 230° C. and 100 s$^{-1}$, is 2900-3300 Pa.s.

This PVDF is in the form of a latex which forms round beads with a homogeneous size and a homogeneous shape (diameter of approximately 0.2 µm on average).

This latex and its method of preparation are well known: see, for example, U.S. Pat. Nos. 3,857,827, 4,360,652, 4,569,978, 3,051,677, 3,178,399, 5,093,427, 4,076,929 or 5,543,217.

Nucleating agent:

1/ PTFE in the form of a latex sold by Du Pont de Nemours under the reference Zonyl 3554 N, 2/ PTFE in the form of a latex sold by Du Pont de Nemours under the reference Zonyl 3667.

Zonyl 3554 N, examined by electron microscopy, shows a varied structure of particles forming agglomerates and strings, the largest dimension of which varies from 0.05 to 0.25 µm.

The acrylic modifier is a PMMA/EA copolymer at 40% in toluene sold by the Company Rohm & Haas under the reference Paraloid B-44S.

The TiO$_2$ is obtained from the company Dupont under the reference Ti-pure R-960.

The latent solvent chosen is isophorone.

A) Preparation of the Formulations a) Preparation of the PVDF+PTFE blend

The two latices are blended in a stirred reactor at room temperature (20° C.) in the following proportions:

| Test | PTFE | Level of PTFE as % by weight of dry matter |
|------|-------|------|
| 1 | — | 0 |
| 2 | 3667 | 0.1 |
| 3 | 3667 | 0.5 |
| 4 | 3554N | 0.5 |
| 5 | 3667 | 1 |

The blend of the two latices is, in each test, coagulated by two freezing/defrosting cycles, filtered off, washed with distilled water and dried in an oven for 12 hours. Five separate powders $P_1$, $P_2$, $P_3$, $P_4$ and $P_5$, corresponding respectively to Tests 1, 2, 3, 4 and 5, are then obtained.

Each of these PVDF/PTFE powders forms part of the composition of two separate formulations: a pigment-free formulation $F_t$, resulting in a transparent final coating, and a formulation with a pigment $F_p$, resulting in an opaque final coating.

Ten formulations, $F_{t1}$, $F_{t2}$, $F_{t3}$, $F_{t4}$ and $F_{t5}$, and $F_{p1}$, $F_{p2}$, $F_{p3}$, $F_{p4}$ and $F_{p5}$, are thus prepared.

The formulations of $F_t$ type have the following composition by weight:

24.5% of $P_n$, n being an integer from 1 to 5
26.2% of Paraloid B-44S
49.3% of isophorone 100.0% in total.

The formulations of $F_p$ type have the following composition by weight:

20.5% of $P_n$, n being an integer from 1 to 5
21.9% of Paraloid B-44S
41.8% of isophorone
15.8% of TiO$_2$ in the rutile form 100.0% in total.

B) Preparation of the Coatings

Each of these 10 formulations is applied to two aluminium panels (Q-panel Lab Products, Cleveland, Ohio, USA) and are baked according to two separate procedures.

a) baking of "spool coating" type conditions:
temperature of the oven, 275° C.
baking time, 90 seconds
then cooling by immediate quenching in water at 20° C.

b) baking of "nozzle atomization" type conditions:
temperature of the oven, 240° C.,
baking time, 15 min
after baking, the samples are removed from the oven and allowed to cool in the open air.

A total of 20 coatings are thus prepared. The latter are subjected to standardized tests in order to quantify their properties:

flexibility (bending) according to ASTM D 4145
pencil hardness according to ASTM D 3363
solvent resistance according to NCCA 4.2.11 (National Coil Coaters Association)
60° gloss according to ASTM D 523.

For analysis by DTA (differential thermal analysis) and examination by optical microscopy, the formulations were applied to Teflon panels and then the latter were subjected to the two above baking methods a) or b). The films can thus be detached from the support. It was confirmed that the nature of the support (aluminium or Teflon) had no influence on the recrystallization of the films.

The results obtained are shown in Tables IV, V and VI.

Discussion

1/ Formulations with pigments: General properties (Table IV)

A) Coatings obtained by coating-type baking and cooling with water (quenching).

All the coatings, nucleated or unnucleated, show good adhesion to the metal substrate. All the coatings exceed 100% adhesion even after exposure to boiling water. Likewise, all the coatings withstand the "O-T bend" flexibility test and have an impact strength up to fracture of the aluminium substrate. Their resistance to abrasion is similar.

The coatings nucleated with PTFE have a better performance in terms of hardness, resistance to the solvent methyl ethyl ketone (MEK) and gloss. For PTFE 3667, a significant improvement in these properties is observed from a concentration of 0.1% by weight with respect to the PVDF of the formulation. Observation of the films by optical microscopy (×500) does not allow the size of the crystallites to be measured, neither for the films nucleated with PTFE nor for the unnucleated films.

B) Coatings obtained by atomization-type baking and cooling in the air.

All the coatings, nucleated or unnucleated, show good adhesion to the metal substrate. All the coatings exceed 100% adhesion even after exposure to boiling water. Likewise, all the coatings withstand the "O-T bend" flexibility test and have an impact strength up to fracture of the aluminium substrate. Their resistance to abrasion is similar.

The coatings nucleated with PTFE have a better performance in terms of hardness and in terms of gloss. For PTFE 3667, a significant improvement in these properties and in the solvent resistance is observed at a concentration of 0.1% by weight with respect to the PVDF of the formulation. Observation of the films by optical microscopy (×500) shows the formation of 20 to 40 μm spherulites in the case of the unnucleated coatings, whereas the size of the crystallites is less than a micron in the case of the coatings nucleated with PTFE.

2/ Formulation with pigments: Differential thermal analysis

Table V shows that the crystallinity of a coating is virtually constant on the basis of the heat of fusion values H shown in the columns. The heats of fusion are in J/gram of polymer in the formulation, the dilution effect due to the presence of the pigment being taken into account. For this composition (PVDF/PMMA=70/30), the nucleating agent does not have an influence on the degree of crystallinity.

More particularly, an increase of 10° to 14° C. in the crystallization temperatures measured during the cooling is observed, which is an effect characteristic of the action of a nucleating agent.

3/ Formulation without pigments: Differential thermal analysis

Table VI shows that, in the absence of pigment, the crystallinity of a coating is lower for a coating cooled in water. For this composition (PVDF/PMMA=70/30), the nucleating agent does not have an influence on the degree of crystallinity.

More particularly, an increase of 15 to 18° C. in the crystallization temperatures measured during the cooling is observed, which is an effect characteristic of the action of a nucleating agent.

Example 3

The procedure as described in Example 2 is followed in the preparation of a formulation analogous to $F_{t5}$ and $F_{t1}$, except that the PVDF is replaced by a copolymer (VF$_2$/HFP) comprising 7% by weight of HFP comonomer and 93% of VF$_2$. A rise of 19° C. in the crystallization temperature measured during the cooling is measured by DTA for the sample comprising the nucleating agent, with respect to the control sample without nucleating agent.

TABLE IV

| Formulations with TiO$_2$ pigment coating-type baking and cooling with water | Properties of the coatings obtained after baking | | | |
|---|---|---|---|---|
| | Hardness | MEK resistance | 60° gloss | Sand jet abrasion 1/mil |
| F$_{p1}$ (without nucleating agent)* | F | 751 | 17 | 52 |
| F$_{p2}$ (+0.1% PTFE 3667) | H | 1010 | 53 | — |
| F$_{p3}$ (+0.5% PTFE 3667) | 2H | 1079 | 48 | — |
| F$_{p4}$ (+1.0% PTFE 3667) | 2H | 864 | 48 | 54 |
| F$_{p5}$ (+0.5% PTFE 3554N) | F | 1106 | 48 | — |
| Formulations with TiO$_2$ pigment atomization-type baking and cooling in air | Hardness | MEK resistance | 60° gloss | Sand jet abrasion 1/mil |
| F$_{p1}$ (with nucleating agent)* | F | 2028 | 17 | 49 |
| F$_{p2}$ (+0.1% PTFE 3667) | 2H | 2361 | 51 | — |
| F$_{p3}$ (+0.5% PTFE 3667) | 2H | 1323 | 47 | — |
| F$_{p4}$ (+1.0% PTFE 3667) | 2H | 1428 | 53 | 51 |
| F$_{p5}$ (+0.5% PTFE 3554N) | 2H | 1412 | 49 | — |

*Comparative formulation and comparative coating

TABLE V

| | Differential thermal analysis | | | | | |
|---|---|---|---|---|---|---|
| | 1st heating | | Cooling | | 2nd heating | |
| Formulations with TiO$_2$ pigment coating-type baking and cooling with water | Melting temperature in ° C. | H** (J/g) | Crystallization temperature in ° C. | H** (J/g) | Melting temperature in ° C. | H** (J/g) |
| F$_{p1}$* | 157 | 28.7 | 111.0 | 30.3 | 157.2 | 27.8 |
| F$_{p2}$ | 156.8 | 31.5 | 124.1 | 31.7 | 155.6 | 30.5 |
| F$_{p3}$ | 157.0 | 26.8 | 124.8 | 32.4 | 156.0 | 30.7 |
| F$_{p4}$ | 156.4 | 24.7 | 125.7 | 32.9 | 155.6 | 30.5 |
| F$_{p5}$ | 156.2 | 24.8 | 124.2 | 32.1 | 155.3 | 30.6 |
| Formulations with TiO$_2$ pigment baking by atomization and cooling in air | Melting temperature in ° C. | H** (J/g) | Crystallization temperature in ° C. | H** (J/g) | Melting temperature in ° C. | H** (J/g) |
| F$_{p1}$* | 156.3 | 30.0 | 114.7 | 32 | 156.8 | 31.7 |
| F$_{p2}$ | 156.8 | 29.9 | 123.8 | 32.9 | 155.8 | 32.5 |
| F$_{p3}$ | 156.7 | 30.7 | 125.0 | 33.7 | 156.1 | 31.9 |
| F$_{p4}$ | 156.0 | 31.2 | 125.7 | 33.0 | 155.8 | 32.7 |
| F$_{p5}$ | 156.4 | 31.4 | 123.9 | 33.5 | 155.5 | 32.5 |

*Comparative formulation and comparative coating

TABLE VI

| | Differential thermal analysis | | | | | |
|---|---|---|---|---|---|---|
| | 1st heating | | Cooling | | 2nd heating | |
| Formulations without TiO$_2$ pigment coating-type baking and cooling with water | Melting temperature in ° C. | H (J/g) | Crystallization temperature in ° C. | H (J/g) | Melting temperature in ° C. | H (J/g) |
| F$_{t1}$*, without nucleating agent | 156.1 | 19.4 | 114.7 | 28.4 | 156.1 | 28.3 |
| F$_{t2}$, 0.1% PTFE 3667 | 156.4 | 19.2 | 128.2 | 29.4 | 156.1 | 30.9 |
| F$_{t3}$, 0.5% PTFE 3667 | 156.1 | 22.0 | 130.9 | 29.9 | 156.6 | 32.0 |
| F$_{t4}$, 1.0% PTFE 3667 | 157.6 | 21.1 | 130.8 | 29.0 | 158.3 | 30.4 |
| F$_{t5}$, 0.5% PTFE 3554N | 156.5 | 18.8 | 131.1 | 30.5 | 157.3 | 30.9 |
| Formulations without pigment baking by atomization and cooling in air | Melting temperature in ° C. | H (J/g) | Crystallization temperature in ° C. | H (J/g) | Melting temperature in ° C. | H (J/g) |
| F$_{t1}$*, without nucleating agent | 156.7 | 29.4 | 112.7 | 31.9 | 155.8 | 33.4 |
| F$_{t2}$, 0.1% PTFE 3667 | 156.6 | 31.4 | 127.9 | 34.2 | 157.3 | — |
| F$_{t3}$, 0.5% PTFE 3667 | 155.0 | 32.5 | 130.7 | 34.4 | 157.0 | 34.1 |

TABLE VI-continued

| | | | | | | |
|---|---|---|---|---|---|---|
| $F_{t4}$, 1.0% PTFE 3667 | 155.3 | 30.9 | 131.1 | 34.3 | 156.6 | 34.2 |
| $F_{t5}$, 0.5% PTFE 3554N | 156.6 | 31.0 | 131.1 | 34.0 | 156.9 | 33.1 |

*Comparative formulation and comparative coating

The invention claimed is:

1. A coating on a substrate, produced from a blend of polymers comprising:
   (a) a semi-crystalline fluorinated polymer,
   (b) an acrylic polymer, and
   (c) from 0.01 to 20% by weight, with respect to the total weight of the semi-crystalline fluorinated polymer and of the acrylic polymer, of a nucleating agent in the form of particles having a melting point greater than that of the semi-crystalline fluorinated polymer.

2. The coating according to claim 1, wherein the particles having a size of 0.05 μm to 5 μm.

3. The coating according to claim 1, wherein the particles have a size of 0.05 μm to 0.5 μm.

4. The coating according to claim 1, wherein the semi-crystalline fluorinated polymer is a vinylidene difluoride with a fluorinated ethylenic monomer or with a non-fluorinated ethylenic compound or a non-fluorinated diene.

5. The coating according to claim 4, wherein the fluorinated ethylenic monomer is vinyl fluoride, hexafluoropropylene, trifluoroethylene, chlorotrifluoroethylene, tetrafluoroethylene or hexafluoroisobutylene, the non-fluorinated ethylenic monomer is cyclohexyl vinyl ether or chloropene.

6. The coating according to claim 4, wherein the semi-crystalline fluorinated polymer is a copolymer of vinylidene difluoride with from 0.1 to 20 mol % of vinyl fluoride, hexafluoropropylene, trifluoroethylene, chlorotrifluoroethylene or tetrafluoroethylene.

7. The coating according to claim 4, wherein the semi-crystalline fluorinated polymer is a vinylidene difluoride homopolmer.

8. The coating according to claim 1, wherein the acrylic polymer is a copolymer of one or more methyl or ethyl esters of acrylic acid or of methacrylic acid, and is optionally polymerized with other polymerizable unsaturated monomers:
   alkyl esters of acrylic acid or of methacrylic acid,
   styrenes,
   nitriles, or
   vinyls, with the additional condition that methyl and/or ethyl acrylate and/or methyl and/or ethyl methacrylate represent, by weight, at least 70% of the total weight of the acrylic polymer.

9. The coating according to claim 8, wherein the acrylic polymer is obtained from one or more monomers of methyl acrylate, methyl methacrylate, ethyl acrylate or ethyl methacrylate.

10. The coating according to claim 1, wherein the nucleating agent is a tetrafluoroethylene homopolymer or a copolymer of tetrafluoroethylene with a fluorinated ethylenic compound.

11. The coating according to claim 10, wherein the nucleating agent is a tetrafluoroethylene copolymer comprising from 0.1 to 20 mol % of vinylidene fluoride, vinyl fluoride, hexafluoropropylene, trifluoroethylene, chlorotrifluoroethylene or hexafluoroisobutylene or alternatively from poly(ethylene-co-tetrafluoro-ethylene) (ETFE), poly(tetrafluoroethylene-co-perfluorovinyl ethers) (PFA) and irradiated PVDF.

12. The coating according to claim 10, wherein the nucleating agent is a tetrafluoroethylene homopolmer.

13. The coating according to claim 1, wherein the nucleating agent is flavanthrone.

14. The coating according to claim 1, wherein the semi-crystalline fluorinated polymer is PVDF and the acrylic (co)polymer is PMMA at a PVDF/PMMA ratio by weight of 95/5 to 30/70.

15. The coating according to claim 14, wherein the PVDF/PMMA ratio by weight is 70/30 to 35/65.

16. The coating according to claim 14, wherein the PVDF/PMMA ratio by weight is 60/40 to 40/60.

17. A process for the preparation of the blend of polymers according to claim 1, comprising blending a latex of the semi-crystalline fluorinated polymer with the nucleating agent, coagulating a blend obtained and drying in order to recover a powder, and blending this powder is with the acrylic polymer and optionally fillers, colorants or processing aids, by extrusion at a temperature of 150° C. to 280° C.

18. A coating according to claim 1, wherein the blend of polymer comprises a latent solvent for the semi-crystalline fluorinated polymer of the composition.

19. A coating according to claim 1, wherein the blend of polymers comprises water as an agent dispersing the composition.

20. A coating according to claim 1, wherein the blend of polymers is in the form of a fine powder having particles with a highest size of the order of several hundred μm.

21. A process for the preparation of the blend of polymers according to claim 18, comprising blending the semi-crystalline fluorinated polymer latex with the nucleating agent, coagulating and drying blend obtained in order to recover a powder, blending the powder with the acrylic (co)polymer and optionally fillers, colorants or processing aids, and dispersing I the latent solvent.

22. A process for the preparation of the blend of polymers according to claim 19, characterized in that comprising blending a semi-crystalline fluorinated polymer latex is blended with the nucleating agent, in that coagulating and drying the blend obtained in order to recover a powder, blending this powder with the acrylic (co)polymer and optionally fillers, colorants or processing aids, and dispersing the combined mixture in water.

23. A process for the preparation of the blend of polymers according to claim 20, comprising blending a latex of the semi-crystalline fluorinated polymer is blended with the nucleating agent, coagulating and drying in that the blend obtained in order to recover a powder, blending this powder with the acrylic polymer and optionally fillers, colorants or processing aids, by extrusion at a temperature of 150° C. to 280° C., and cooling then milling extrudate to give a fine powder.

24. A process for obtaining a coating according to claim 18, comprising a stage of baking a substrate covered with the formulation at a temperature T which is high enough to produce a liquid phase comprising the semi-crystalline fluorinated polymer and in which the nucleating agent remains at least partially in the form of solid crystalline seeds, this temperature T being below the melting temperature of the nucleating agent, and a cooling stage in which the semi-crystalline fluorinated polymer at least partially crystallizes with the formation of spherulites with a size of less than 5 µm.

25. A process for obtaining a coating according to claim 1, comprising blending a latex of the semi-crystalline fluorinated polymer with the nucleating agent, coagulating and drying the blend obtained in order to recover a powder, and blending this powder with the acrylic polymer and optionally fillers, colorants or processing aids, by extrusion at a temperature of 150° C. to 280° C. while directly covering substrate to be protected.

26. A coating according to claim 18, capable of being obtained by baking and the cooling of a substrate covered with the formulation, in the form of a continuous film which adheres to the substrate while covering it, this film comprising fluorinated polymer spherulites with a size of less than 5 µm.

* * * * *